Figure 1:
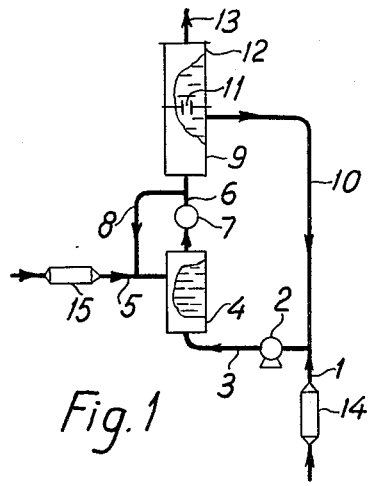

Dec. 26, 1961   F. T. E. PALMQVIST   3,014,790
APPARATUS FOR CONTINUOUS PREPARATION OF CHEMICAL PRODUCTS
Original Filed Dec. 16, 1953                                2 Sheets-Sheet 1

INVENTOR.
Fredrik Teodor Emanuel Palmqvist
BY
Davis, Hoxie, Faithfull & Hapgood
ATTORNEYS United States Patent Office 3,014,790
Patented Dec. 26, 1961

3,014,790
APPARATUS FOR CONTINUOUS PREPARATION OF CHEMICAL PRODUCTS
Fredrik Teodor Emanuel Palmqvist, Solna, Sweden, assignor to Aktiebolaget Separator, Stockholm, Sweden, a corporation of Sweden
Original application Dec. 16, 1953, Ser. No. 398,560. Divided and this application Jan. 2, 1959, Ser. No. 784,788
7 Claims. (Cl. 23—260)

The present invention relates to an apparatus for continuous preparation of chemical products.

In the preparation of chemical products, especially where the reaction components are mutually insoluble or hard to dissolve in each other, very long reaction times are in general necessary to bring about the chemical reaction desired. When graphically illustrated with the time as abscissa and the amount of reaction product formed as ordinate, the reaction process in such reactions is in most cases S-shaped; in other words, the reaction is autocatalytic. However, by frequently supplying considerable quantities of energy, for instance by means of agitation, it is possible to shorten the reaction time, since by agitation an enlargement of the boundary surfaces between the reacting substances is obtained. In continuous processes, colloid mills, for instance, are often used for effecting the required fine disintegration so that the reaction will occur at the desired rate. The quantities of energy which must be supplied when using such means are often so large that they involve a considerable economic burden to the process. It is desirable, therefore, to reduce the consumption of energy. This has proved possible in reactions of the kind referred to above, if the reaction product formed is surface-active or is capable of dissolving or finely dividing one of the reaction components, in particular the oleophilic component in reactions between hydrophilic and oleophilic components. Examples of this are saponification, sulphonation and sulphatation, in which, to bring the reaction components into intimate contact with each other, physical powers may be utilized which are inherent in the reaction products formed and which are capable of dispersing or dissolving one of the reaction components. In saponification reactions, for example, fat seems to be dissolved in the soap micelles, whereupon the saponification will take place in homogeneous phase. The soap thus works as an accelerator of the saponification reaction proper. Hence, by mixing fat and lye in a certain sequence into a previously formed soap, it is possible to accelerate substantially the saponification reaction and to reduce the consumption of the mechanical energy required for effecting the necessary intimate mixing of the saponification components.

A process in which such conditions are utilized is disclosed in a copending application of F. T. Palmqvist, Serial No. 203,840, filed January 2, 1951, now U.S. Pat. No. 2,727,915, dated December 20, 1955. That process involves continuous preparation of a chemical product (soap), in which, after continuity of operation has been established, a pre-formed reaction product is kept in constant circulation in a special circuit (here called the first circuit) to which one of the reaction components (here called the first component) is added at a suitable point of the path in order to react with residues of another reaction component (here called the second component) which residues have not as yet reacted with the first component, the second component being freshly supplied to the same circuit. These two components are continuously added in fixed proportions and are atomized in the circulating mass, and a quantity of the pre-formed product corresponding to the quantity of the added components is continuously taken away from the circuit.

The present invention has for its principal object the provision of an apparatus for obtaining a better utilization of the above-mentioned physical powers, for the purpose of intimately mixing the reaction components with each other. This object is accomplished by keeping part of the reaction mixture in constant circulation in another circuit, here called the second circuit, which is formed by a portion of the first circuit and by a pipe connecting both the ends of this portion of the first circuit. It has proved advantageous that the quantity of reaction mixture passing per unit of time through the second circuit be kept large, preferably larger than that of the first circuit, say at least twice as large, reckoned in those parts of the circuits which are not common to them. It is also advantageous to introduce the second component into the second circuit, since there it is disintegrated particularly effectively. Owing to this fact, the second component should be that component which is most difficult to mix homogeneously into the other material, for example, the oleophilic component in a reaction mixture of hydrophilic and oleophilic components. In saponification, if lye is used as the first component and fat as the second component, the fat is dispersed extremely finely and instantaneously into the mixture of lye and pre-formed soap circulating in the circuit. The contact surface between the lye and fat will then be particularly large and the saponification will take place most rapidly.

Since the reaction between the components takes a certain time to be accomplished as completely as possible, reaction vessels are preferably inserted in the circuits. Thus, the reaction mixture in the first circuit may pass through a reaction vessel preceding or following the second circuit (or both), reckoned in the flow direction of the reaction mixture; and likewise the reaction mixture may pass through a reaction vessel in the second circuit and, if necessary, the product finally discharged from the first circuit may pass through a further reaction vessel. Moreover, for regulation of the temperature to the desired value, the reaction mixture may be heated or cooled, as required, by using reaction vessels in the form of heat exchangers.

An apparatus made according to the present invention comprises a circulating pump, a pair of reaction vessels, a communication connecting the pump and the vessels in series in a circuit, a circulating pump and a communication forming a second circuit including a portion of said first circuit between the two reaction vessels, a feed pipe communicating with the first circuit for supplying a first component thereto, a feed pipe communicating with the second circuit for supplying a second component thereto and a product discharge pipe leading from the first circuit at a point beyond one of said vessels, reckoned in the direction of flow through the circuit.

Figure 2:
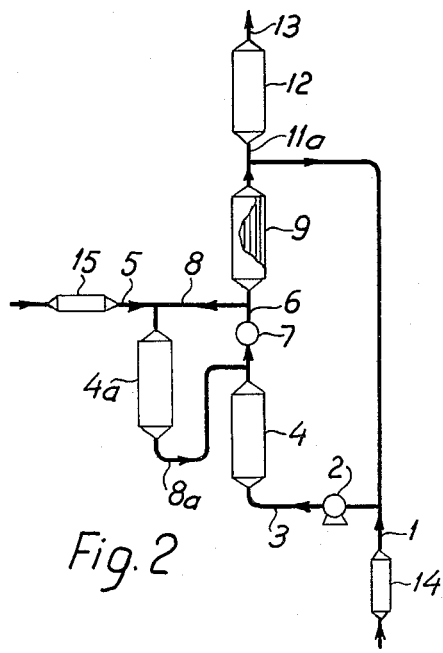
Figure 3:
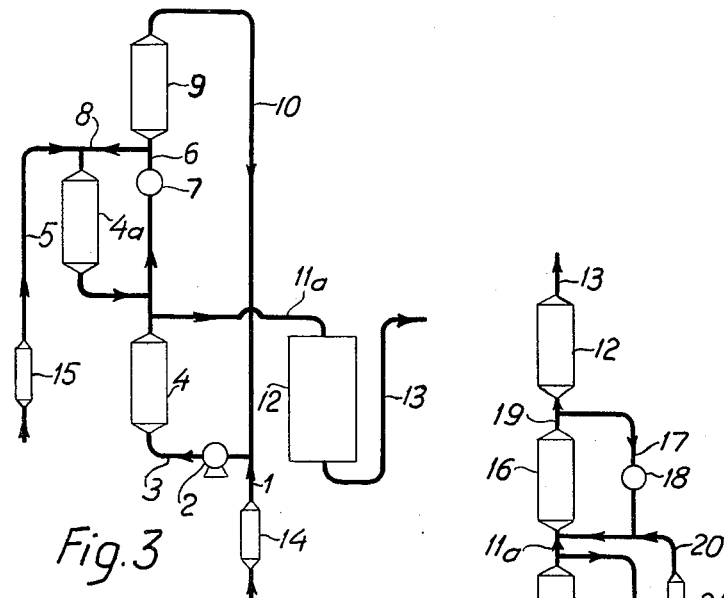
Figure 4:
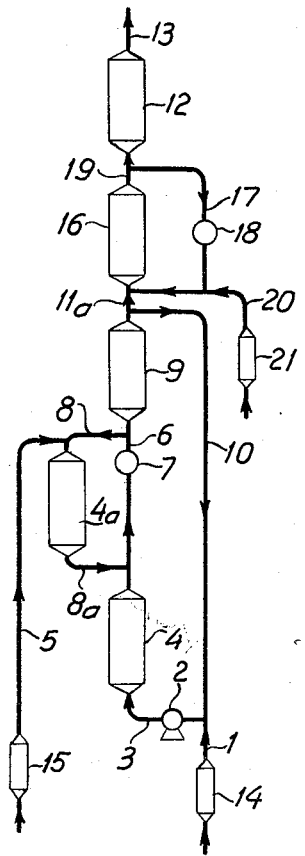

The invention is described in greater detail in the following, with reference to the accompanying drawings, in which:

FIG. 1 is a schematic view of an installation for carrying out a saponification process according to the invention, and FIGS. 2–4 are similar views of other installations for sulphonation or sulphatation according to the invention.

According to FIG. 1, lye is fed to the first circuit through a pipe 1 immediately preceding a circulation pump 2, reckoned in the flow direction. In the pump 2, mixing of the lye takes place with the soap mass flowing into the pump, so that this mass with an excess of lye flows through a pipe 3 into a reaction zone or column 4, where the lye is given time to saponify residues of unsaponified fat or fat difficult to saponify. Through a pipe 5, fat is fed into the column 4 at a distance above its bottom. The fat supplied is thus saponified by the excess of lye. From column 4, the soap mass passes through a pipe 6, in which a circulation pump 7 is inserted. From pipe 6, a portion of the soap mass is fed through a pipe 8, which opens into pipe 5. The second circuit is thus closed and comprises the parts 5, 6, 7 and 8. The pipe 6 opens into a further reaction zone or column 9, from the upper end of which a pipe 10 leads back to pump 2, whereby the first circuit is also closed. Through the outlet 11 from column 9, prepared soap mass is taken out in a quantity per unit of time corresponding to the sum of the amounts of lye and fat supplied through pipes 1 and 5. To the outlet 11, a further reaction column 12 is connected, through which the soap mass passes before it finally leaves the plant through a pipe 13. The zone or column 12 insures final saponification of unsaponified fat, if any. The various columns, of course, need only be as large in volumn as is required because of the difficulty of saponifying the fat used, or in order to obtain the desired degree of complete saponification. For regulating the saponification temperature, the lye and fat may pass through heaters 14 and 15, respectively, before being fed to the plant.

In the first circuit, which comprises the parts 2, 3, 4, 6, 7, 9 and 10, the quantity passing per unit of time is preferably kept at a multiple of the throughput rate of the whole plant, for instance 6 times the latter rate. Similar conditions apply to the second circuit in relation to the first one. In the parts 6—7 common to the two circuits, the quantity passing per unit of time will, of course, be equal to the sum of the quantities flowing through the remaining parts of the circuits.

The amount of circulation in the circuits is important. In the manufacture of soap, for example, if the amount of circulation is low in relation to the total throughput rate, a fixed quantity of lye enters into a comparatively small soap quantity. As a result, graining of the soap can take place, i.e., compact lumps and flocks of neat soap can be formed, against which the lye has only a small surface of contact. Thus, unsaponified fat which may be present in the interior of these lumps cannot be completely saponified, in spite of there being a great excess of lye. It is of importance, therefore, that the circulation amount be so chosen that the soap, after lye has been added, either maintains the same phase condition as prevailed prior to the addition of lye (of course, with a displacement to the right in a McBain diagram) or is grained only slightly. Such a diagram is described in Bailey's "Industrial Oil and Fat Products," 1945, page 625. In general, a slightly grained soap is still so smooth that the action of the lye is effective. It also has been found that the fat is very easily absorbed and emulsified in a partly grained soap.

In FIG. 2 as well as in the subsequent figures, showing plants for a sulphatation process, the elements corresponding to those in FIG. 1 have identical reference numerals. In addition, it is pointed out that in FIGS. 2–4 the reaction column 4a corresponds to the upper part of reaction column 4 in FIG. 1; the pipe 8a in the second circuit connects columns 4a and 4; and the pipe 11a, corresponding to passage 11 in FIG. 1, connects columns 9 and 12. Owing to the fact that sulphonation reactions are usually very exothermic, it has been found desirable to form the reaction columns as tube coolers, in which the reaction mixture is subjected to countercurrent cooling with water or with salt solution, or is cooled through expansion of a direct cooling agent.

In the plant of FIG. 3, the reaction product is withdrawn through pipe 11a, after the first component has been allowed to react upon the circulating flow of reaction product, but before the second component has been introduced into the plant. That is, the reaction product is removed promptly after passing through the reaction column 4. This apparatus is especially suitable in case the final stage of the reaction proceeds very slowly and requires a great excess of one of the reaction components, to enable full or satisfactory reaction.

The plant of FIG. 4 has an extra circuit. This plant is primarily a modification of the plant shown in FIG. 2, in which a further reaction column 16 has been inserted between columns 9 and 12, the two ends of the column 16 having been connected with one another by means of a pipe 17 provided with a circulation pump 18. The column 16 communicates with column 12 through a pipe 19. This installation is suitable when the reaction product is very temperature-sensitive, or when it is very difficult to obtain complete reaction. In sulphonation or sulphatation, for example, oleum of high $SO_3$-content may be added through a pipe 20, in which a heat exchanger 21 for the oleum is also inserted. In general, a very good economy of chemicals is obtained through this mode of operation.

The sulphonation is effected by introducing the sulphonation agent (e.g., sulphuric acid or oleum) through pipe 1, and by introducing the material to be sulphonated (e.g., dodecyl benzene or some fatty alcohol) through pipe 5.

In sulphonations made according to the present invention, the sulphonation occurs at a high rate; and if the resulting reaction heat is removed rapidly during the operation, a light sulphonation product is obtained, because side-reactions (such as oxidation and polymerization reactions) which darken the product do not have the necessary time to take place to any large extent.

The above are merely examples of the use of this process; and it will be understood that the process can be used generally for those reactions in which large boundary surfaces between the reacting substances are necessary to bring about the reaction, and in which the reaction product formed causes formation of the desired large boundary surface by dissolving, molecularly absorbing, or otherwise finely dividing one of the components.

An advantage of the present method is that the consumption of mechanical energy is considerably reduced as compared with that whch is required in other processes. Moreover, the size or volume of the plant can be small, due to the high reaction rate obtained by introducing the reaction components at points where the conditions are the most favorable for their functioning. Further, the high flow rate in the system facilitates an efficient temperature control, which is a necessary condition for the accomplishment of temperature-sensitive reactions.

The circulation system of the present invention also serves to overcome the effect of fluctuations in the dosage. Thus, low speed piston pumps may be used as the dosage means, which is an advantage because these pumps are characterized by their safety and low maintenance costs.

Further, the plant can be made totally closed, which means that it may be operated at elevated pressures and at temperatures above the boiling point of the most volatile reaction component. This is of great advantage, since the reaction rate is further increased in this way, with the consequence that the volume of the plant may be reduced. Even if the plant does not operate at superatmospheric pressure and at elevated temperature, a closed system is advantageous in most cases, since vessels for keeping a constant level are eliminated, the introduction of impurities is avoided, and irrelevant reactions, such as oxidation from the oxygen of the air, are avoided. If some component is poisonous or has a high vapor pressure so that losses may occur, it is also advantageous or, in many cases, necessary to operate with a closed system.

The apparatus of the present invention has the mechanical advantage that the means by which circulation is effected may consist of standard pumps accessible in the market. Thus, special and costly apparatus can be avoided.

With the new apparatus, good economy of chemicals is obtained. It has proved possible to reduce the consumption of chemicals considerably as compared with other methods. In autocatalytic reactions, the reaction rate slows toward the end, when the reaction components begin to be consumed. This slowing down is particularly noticeable in those reactions in which water is split off and dilutes one of the reaction components. In sulphonation and sulphatation, for example, this reaction water has a strong effect in that when one mol sulphonate is formed, one mol water is released, which causes the acid concentration to be reduced considerably and the reaction rate to decrease sharply. In the present method, a large quantity of reaction product is circulated in the first circuit. The acid present in this product is strongly diluted. As it meets the flow of fresh acid from pipe 1 (see FIG. 2), the concentration rises to a degree corresponding to the quantity and concentration of the newly supplied acid. The reaction with residues of the unreacted olephilic phase now accelerates rapidly (vessel 4) and a practically complete reaction is obtained. A result of this is that higher acid concentration can and should be used in the present process, as compared with batchwise sulphonation, for example. Moreover, owing to the fact that a relatively large excess of acid is present in vessel 4, the temperature there can be kept very low and nevertheless a complete sulphonation can be obtained, which is of considerable importance for the color of the final product.

The apparatus is not confined to use with liquids exclusively but may also be applied to liquids combined with solids or gases. An example of the latter application is sulphohalogenization with $SO_2Cl_2$. In that case, the plant is preferably provided with means for the supply of active or actinic light, which is necessary to enable the reaction to take place. However, with the present apparatus, the reaction rate and the economy is increased beyond what can be obtained by means of other known processes.

Example 1

A fat mixture with the saponification number 216 is saponified with caustic soda lye of 27.1% concentration. 626 kg. fat mixture and 374 kg. lye are supplied continuously per hour. The capacities of the reaction vessels are the following (see FIG. 1): vessel 4=80 liters, vessel 9=60 liters and vessel 12=110 liters. The temperature in the plant is adjusted to 125° C. by regulating the temperature of the supplied reaction components. 6000 kg. and 12,000 kg./hr. pass through pipes 10 and 8, respectively (see FIG. 1). The total average time during which the material remains in the plant will be 15 minutes. The soap leaving column 12 is completely saponified. Batchwise production of soap takes 12 hours, reckoned from the point of time when the supply of the components to the saponification vessel starts, up to the moment complete saponification is obtained. If the saponification is to be achieved in a short time, it is possible by means of a continuous process to effect the mixing of fat and lye with mechanical energy alone, e.g., in a colloid mill. In that case, the same throughput rate as that stated in the introductory part of this example will take about 25 H.P. Complete saponification is obtained only in a subsequent reaction column, using a reaction time of 30 minutes.

Example 2

Dodecyl benzene is sulphated with oleum containing 20% $SO_3$. 500 kg. dodecyl benzene and 500 kg. oleum are supplied continuously per hour. The capacities of the reaction vessels are as follows (see FIG. 3); vessel 4=100 liters, 4a=80 liters, 9=110 liters, and 12=500 liters. By removing reaction heat through the cooling devices in the reaction vessel, the temperature in vessels 4, 4a and 9 is kept at 12–15° C., and in vessel 12 it is kept at 12–20° C. 7000 and 15,000 kg./hr. pass through pipes 10 and 8, respectively. The average time during which the material remains in the vessels 4, 4a, 9 and 12 is 48 minutes. Neutralized sulphonate prepared under the conditions stated above is practically white in color and contains 1.8% unsulphonated product. To reach the same sulphonation degree in batchwise sulphonation, a period of about 4–5 hours is required. Moreover, the product darkens as a consequence of side-reactions occurring during the long reaction time and because local overheating caused by the acid cannot be avoided.

Example 3

Distilled fatty acid with saponification number 224 is saponified with 27.3% of sodium carbonate solution. 540 kg. fatty acid and 460 kg. sodium carbonate solution are supplied continuously per hour. The capacities of the reaction vessels are as follows (see FIG. 1): vessel 4=40 liters, vessel 9=30 liters and vessel 12=55 liters. The temperature is kept at 110° C. 6000 kg. and 9000 kg./hr. pass through pipes 10 and 8, respectively. The average time during which the material remains in the plant is about 7.5 minutes. Complete reaction of the fatty acids is obtained in this way.

This application is a division of my copending application Serial No. 398,560, filed December 16, 1953, now Patent No. 2,906,760.

It will be apparent that the first circuit 2, 3, 4, 6, 7, 9 and 10 has an inlet to which pipe 1 leads, and the latter pipe forms a means for positively feeding a first component into the first circuit; while the second circuit 5 (the part thereof between pipe 8 and column 4), 6, 7 and 8 has an inlet to which part of pipe 5 leads (FIG. 1), and the latter pipe forms a means for positively feeding a second component into this second circuit. By locating the second pump 7 in the portion 6 which is common to the two circuits, this pump not only serves to induce circulation in the second circuit but also serves (incident to its pumping action) to promote mixing of the two different components flowing through this common portion. Thus, as compared with a situation in which the second pump 7 is located in piping 8, for example, the present invention provides more complete assurance that the material circulating to the component inlet of each of the two circuits will be a substantially uniform and intimate mixture of the two components.

I claim:

1. Apparatus for preparing chemical products, which comprises a first circulating pump, a pair of reaction vessels, piping connecting the pump and the vessels in series in a first closed circuit, additional piping leading from a point of said circuit and returning to said circuit at a point thereof spaced from the first mentioned point, the first circuit including only a portion thereof located between said points and forming with said additional piping a second closed circuit, whereby said portion is common to both circuits, said common portion being located between the two reaction vessels, each circuit having a separate inlet spaced from said common portion, means for positively feeding a first component into the first circuit through the inlet thereof, means for positively feeding a second component into the second circuit through the inlet thereof, a product discharge pipe leading from the first circuit at a point spaced from said common portion, and a second circulating pump in said common portion of the two circuits, whereby the second pump is operable to induce circulation in the second circuit and also to mix said components flowing through said common portion, one of said reaction vessels being located between the two pumps.

2. Apparatus according to claim 1, comprising also a reaction vessel in said second circuit.

3. Apparatus according to claim 1, comprising also a reaction vessel in said second circuit, said inlet of the second circuit being located at a point preceding said last vessel, reckoned in the direction of flow through the second circuit.

4. Apparatus according to claim 1, comprising also a circulating pump and piping forming a third circuit including a portion of said discharge pipe.

5. Apparatus according to claim 1 comprising also a circulating pump and piping forming a third circuit including a portion of said discharge pipe, and a reaction vessel in said third circuit.

6. Apparatus according to claim 1, comprising also a heat exchanger communicating with one of said circuits for regulating the temperature of the circulating material.

7. Apparatus according to claim 1, in which said reaction vessels are heat exchangers.

References Cited in the file of this patent

UNITED STATES PATENTS

| | | |
|---|---|---|
| 2,332,527 | Pyzel | Oct. 26, 1943 |
| 2,852,347 | Palmqvist | Sept. 16, 1958 |